United States Patent [19]
Laukzemis

[11] Patent Number: 5,439,395
[45] Date of Patent: Aug. 8, 1995

[54] DSX JACK

[75] Inventor: Daniel A. Laukzemis, Township of Roxbury, Morris County, N.J.

[73] Assignee: AT&T Corp., Murray Hill, N.J.

[21] Appl. No.: 113,119

[22] Filed: Aug. 30, 1993

[51] Int. Cl.[6] .......................................... H01R 17/18
[52] U.S. Cl. ................................................... 439/668
[58] Field of Search ............... 439/675, 668, 669, 620, 439/578-585, 540

[56] References Cited

U.S. PATENT DOCUMENTS 4,770,639  9/1988  Lau .
4,784,609  11/1988  Lau .
4,840,568  6/1989  Burroughs et al. .
4,975,087  12/1990  Williams et al. .

OTHER PUBLICATIONS

ADC Telecommunications Inc. Catalog, p. 29 (1986).

Primary Examiner—David L. Pirlot
Attorney, Agent, or Firm—Lester H. Birnbaum

[57] ABSTRACT

Disclosed is a jack panel module for use in telecommunications equipment. Each module includes a plurality of stand-alone jack assemblies with an integral electrical connection from the front of the panel to a series of rear terminals. Each panel assembly includes input and output plug-receiving sleeves which are staggered with respect to adjacent assemblies to provide sufficient room for standard sized plugs.

10 Claims, 3 Drawing Sheets

DSX JACK

BACKGROUND OF THE INVENTION

This invention relates to jack panels used in telecommunications equipment.

Digital signal cross-connect (DSX) equipment is one example of the use of jack panels for electrical connection between cables in a central office. A panel usually comprises a series of individual or modular jack assemblies mounted within a standard sized shelf, which are typically 17- or 23-inches wide. Each jack assembly includes a column of sleeves which receives plugs for providing patch rearrangement and test capability. Typically, there are sleeves for input and output connections and for monitoring purposes. A modular arrangement may include a front panel with several (typically four) columns of such sleeves. (See, e.g., U.S. Pat. No. 4,975,087 issued to Williams et al.)

In the typical designs, the jack assembly is made from separable components which must be electronically connected before the assembly is inserted in the shelf (see U.S. Pat. Nos. 4,784,609 and 4,770,639), or the rear of the assembly must be plugged into electrical connectors at the rear of the shelf (see U.S. Pat. No. 4,840,568.) While such designs are adequate, they introduce areas of the assembly where electrical failures can result.

A further problem has arisen in DSX equipment in an attempt to achieve greater packing density. Specifically, for telephone applications it is desirable to pack 84 assemblies into the standard 23-inch shelf. However, providing such a packing density results in adjacent sleeves being too close together to use standard size plugs. While smaller plugs could be used (see, e.g., U.S. Pat. No. 4,975,087 cited supra), it is more desirable for users to employ the standard size plug which is already on hand.

It is also desirable to provide the apparatus needed for one DSX circuit in a single assembly that may be replaced in the field without disturbing adjacent circuits. Earlier designs have often employed front panels that span multiple jack assemblies. This makes it difficult to replace an individual jack assembly without disturbing plugs that are inserted in adjacent jack assemblies.

SUMMARY OF THE INVENTION

The invention in one aspect is a jack assembly comprising a front panel including a single column of at least two sleeves for receiving plugs therein. Jack switch assemblies are mounted rearward of the sleeves and aligned therewith so that the switch assemblies receive and make electrical contact to the plugs inserted into associated sleeves. The switch assemblies are soldered to one edge of a printed circuit board having major surfaces essentially perpendicular to the front panel. Terminal pins are soldered to the opposite edge of the printed circuit board.

In accordance with another aspect, the invention is a jack panel module comprising a holder and at least two jack assemblies mounted therein. Each assembly comprises a front panel including a column of at least two sleeves for receiving plugs therein. The sleeves are positioned on their front panels so that they are staggered with respect to the sleeves of an adjacent assembly.

BRIEF DESCRIPTION OF THE DRAWING

These and other features of the invention are delineated in detail in the following description. In the drawings.

Figure 1:
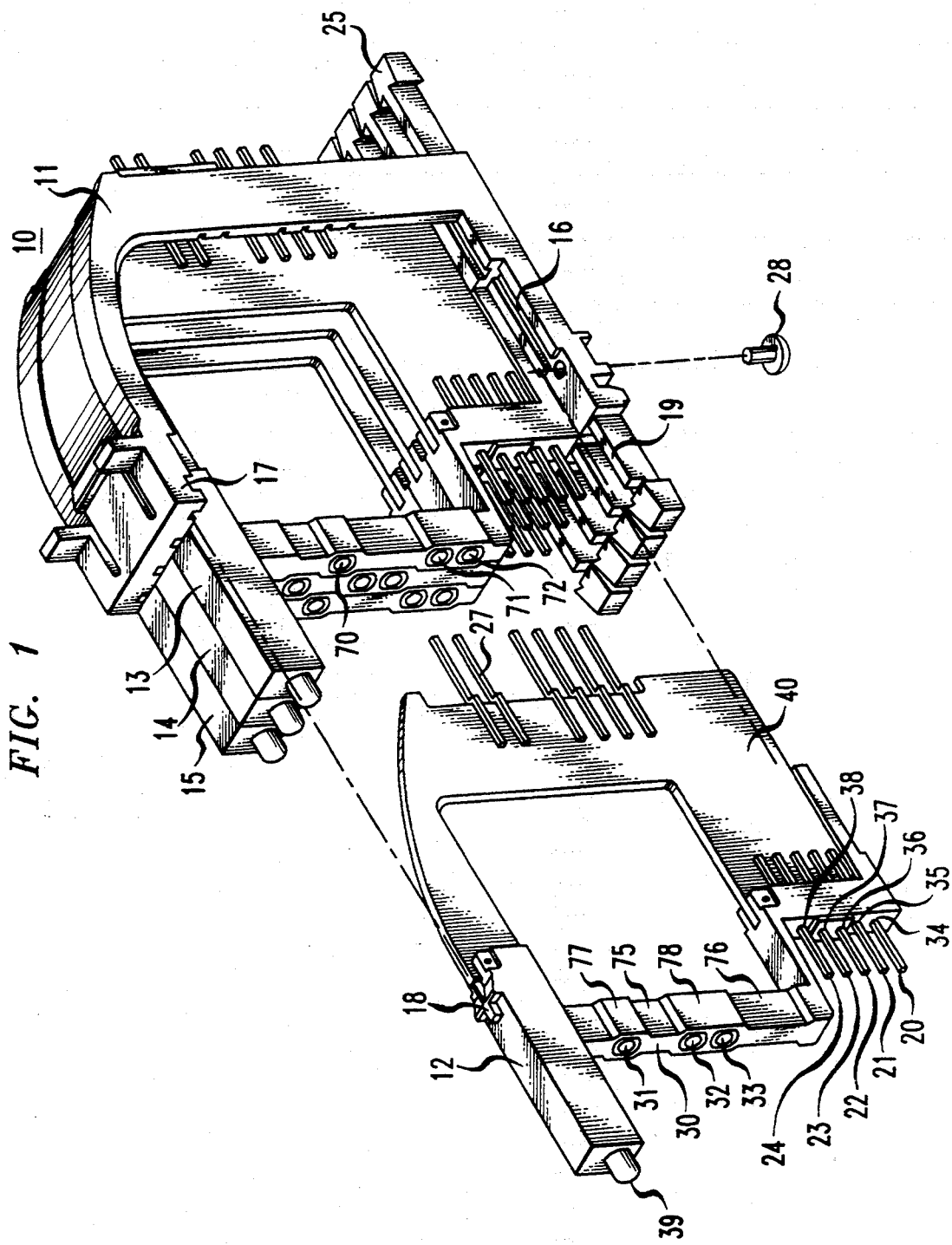
FIG. 1 is a perspective view of a jack panel module and jack assemblies in accordance with an embodiment of the invention.

It will be appreciated that, for purposes of illustration, these figures are not necessarily drawn to scale. Also, for purposes of clarity the individual spring assemblies that are part of the jack assemblies are not shown in FIG. 1.

DETAILED DESCRIPTION

The module, 10, in accordance with an embodiment of the invention, includes a holder, 11, typically made of plastic, which includes therein a plurality of jack assemblies, in this example, four assemblies, 12, 13, 14, and 15. Each module slides into the holder in a groove, e.g., 16, at the bottom of the holder and is held in place by a latch, 17, at the forward top end of the holder which engages a tab, 18, on the top of the assembly. A screw, 28, prevents accidental removal of the jack assembly. The forward bottom end of the holder includes a plurality of fanning strips, e.g., 19, for holding the wires (not shown) which will be wrapped around the front terminal pins, e.g., 20-24, of the jack assemblies. The rearward end of the holder, 11, also includes a plurality of fanning strips, e.g., 25. The rear face of the holder includes a plurality of apertures, e.g., 26, for receiving therethrough the rear terminal pins, e.g., 27, of the jack assemblies. The fanning strips, e.g., 25, will hold the wires (not shown) wrapped around the rear terminal pins, e.g., 27.

The jack assemblies, e.g., 12, each include a front panel, 30, which has defined therein a vertical column of apertures. In this example, there are three apertures, 31, 32, and 33, but the invention is applicable to assemblies including at least two apertures. Each aperture is adapted to receive therein a standard jack plug (not shown). Aperture 31 will receive a plug for monitoring, while apertures 32 and 33 will receive output and input plugs, respectively. The front panel 30 also includes a plurality of apertures 34-38 to allow the front terminal pins, 20-24, to protrude therethrough. A replaceable panel light, 39, is plugged into spring-loaded contacts which are soldered to a printed circuit board, 40.

The front panel member 30 is mechanically attached to the printed circuit board, 40, whose major surfaces are essentially perpendicular to the front face of the front panel. The panel member is typically attached to the board by rivets. The front pins 20-24 are soldered to the front edge of the board, and the rear pins, e.g., 27, are soldered to the rear edge of the board. Conductive paths, e.g., 41, are deposited on both major surfaces of the board to provide electrical connections between the pins and other components of the assembly.

Figure 2:
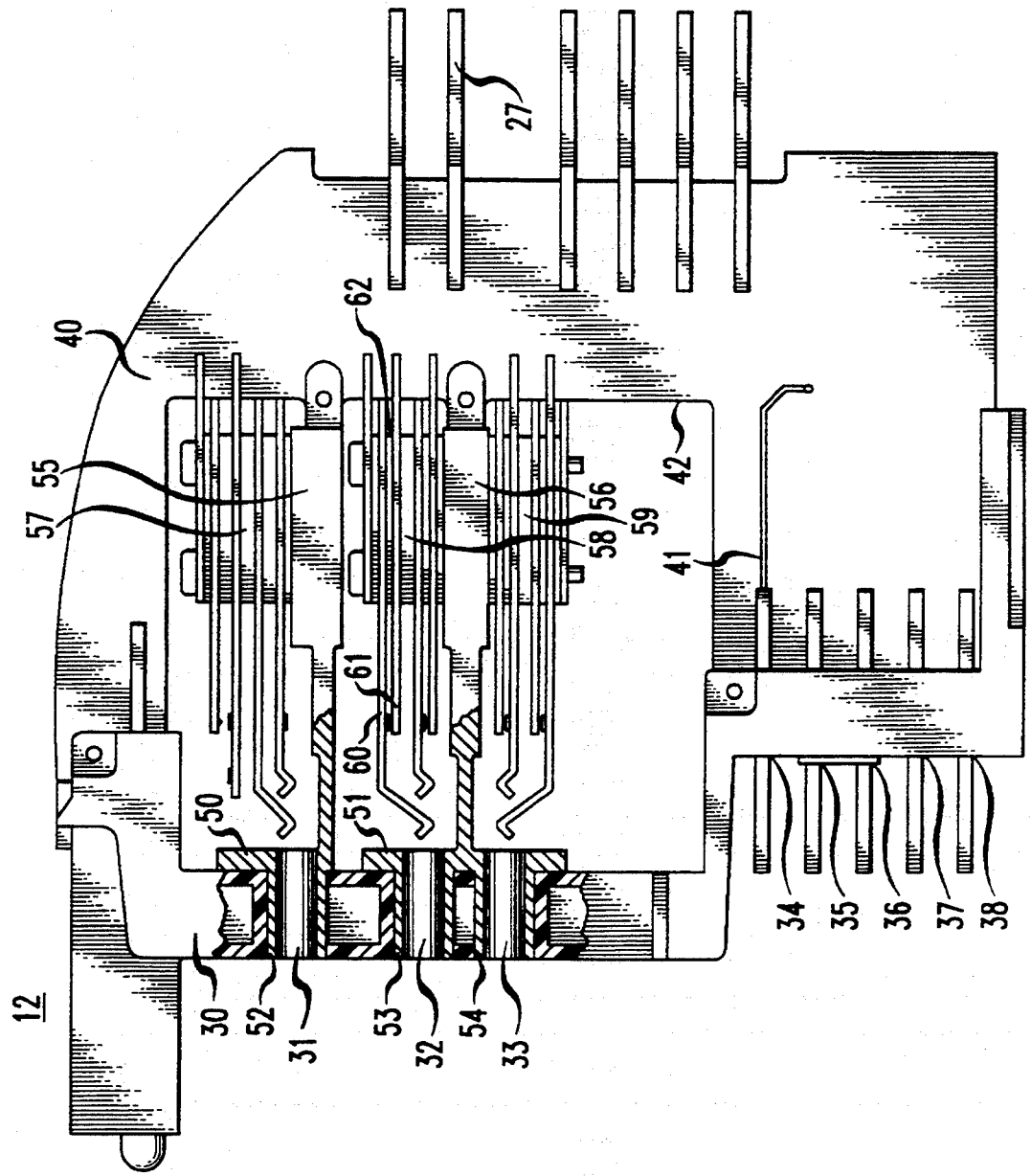
FIG. 2 is a more detailed partly cutaway side view of a jack assembly which is part of the module of FIG. 1.
Figure 3:
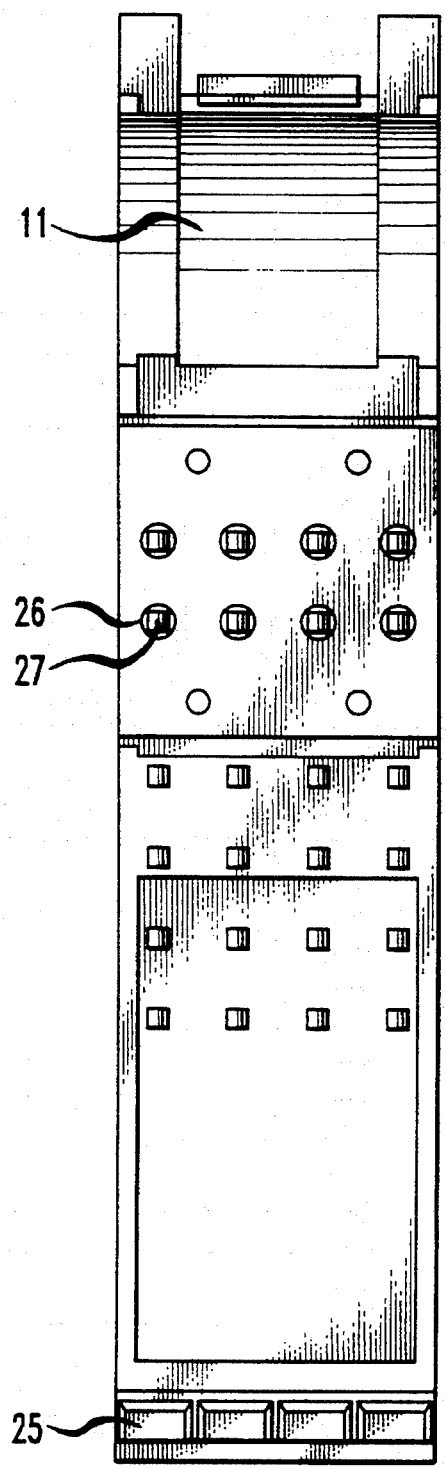
FIG. 3 is a rear view of the module of FIG. 1.

As shown in the more detailed side view of FIG. 2, two jack frames, 50 and 51, are mounted to the rear frame of the panel 30. Alternatively, a single frame could be employed. However, two frames are desirable because of ease of assembly. The frames 50 and 51 include sleeves, 52 and 53, 54 respectively, which are inserted within associated apertures 31, 32 and 33 in the panel member 30. The frames are mounted to the panel member, typically by a snap fit.

Each frame, 50 and 51, further includes a switch support member, 55 and 56, respectively, which extends from the rear face of the panel, 30, to an intermediate edge, 42, of the printed circuit board 40. The support members, 55 and 56, are mechanically attached to the edge of the board 40 by means of rivets. The frame and the support member are typically made of a single material comprising a zinc alloy.

Mounted on a top portion of the support member 55 is a jack switch assembly 57. Mounted on top and bottom portions of support member 56 are jack switch assemblies, 58 and 59, respectively. Each switch assembly, e.g., 58, includes a stacked set of cantilever beam contact members, e.g., 60 and 61, which is aligned with an appropriate sleeve, e.g., 53, in the jack frame, e.g., 51, in order to produce an appropriate electrical contact with the jack plug (not shown) inserted into the sleeve. The cantilever beam contact members are separated by dielectric spacers, e.g., 62. The ends of the contact members, e.g., 60 and 61, opposite to the sleeves (e.g., 53) are soldered to the intermediate edge 42 of the circuit board 40. Conductive paths on the board, 40, provide electrical connection between the switch assemblies and the appropriate forward and rear terminal pins, e.g., 27 and 24. The switch assemblies, 57, 58 and 59, are typically mounted to the support members, 55 and 56, by means of screws.

It will be noted, therefore, that each adjacent assembly, 12–15, is an integral, stand-alone element with no separable electrical connections between the cantilever beam members and the terminal pins which could fail in the field.

It will also be noted that the positions of the apertures, e.g., 31, 32, 33, (and their associated sleeves) in the front panel of each assembly (e.g., 12) have been staggered with respect to the apertures, e.g., 70, 71, 72, (and their associated sleeves) in each adjacent assembly (e.g., 13). Thus, for example, the monitor sleeve of assemblies 12 and 14 could be approximately 1.16 inches from the top of their respective panels, while the monitor sleeves of assemblies 13 and 15 could be approximately 0.88 inches from the top of their respective panels. The output and input sleeves of assemblies 12 and 14 would be 2.04 inches and 2.35 inches from the top of their panels, while the output and input sleeves of assemblies 13 and 15 would be approximately 1.45 inches and 1.76 inches from the top of their panels. The staggering of the holes permits standard plugs to be inserted into the sleeves since the nearest horizontal neighbor for each sleeve is a distance more than the width of an adjacent panel, thus providing plenty of room for the dielectric housing of the plug. Also, each front panel (e.g., 30) has portions, e.g., 75 and 76, of narrower width than the portions, e.g., 77 and 78, including the sleeves. These thinner portions will be adjacent the thicker portions of an adjacent assembly (e.g., 13).

The staggering of the holes and the thinner portions of each panel allow standard jack plugs (with 0.173 inches diameter) to be used even in systems where 84 assemblies are mounted in a standard 23-inch shelf, and where the horizontal distance between vertical centerlines of sleeves in adjacent assemblies (e.g., 12, 13) is only ¼ inch.

Various indications of the invention will become apparent to those skilled in the art. All such variations which basically rely on the teachings through which the invention has advanced the art are properly considered within the scope of the invention.

What is claimed is:

1. A jack assembly comprising:
    a front panel including a single column of at least two sleeves for receiving plugs therein;
    switch assemblies mounted rearward therewith so that the switch assembles are adapted to receive and make electrical contact to plugs inserted into associated sleeves, the switch assemblies being permanently fixed to an edge of a printed circuit board having major surfaces essentially perpendicular to the front panel; and
    terminal pins permanently fixed to a rear edge of the printed circuit board to form a permanent continuous electrical path between the switch assemblies and the pins.

2. The assembly according to claim 1 wherein the front panel includes portions which are thinner than portions including the sleeves.

3. The assembly according to claim 1 wherein the front panel is mechanically attached to a front edge of the circuit board while the switch assemblies are soldered to an intermediate edge of the circuit board.

4. The assembly according to claim 3 further comprising a plurality of terminal pins mounted to the front edge of the circuit board and protruding through the panel.

5. The assembly according to claim 1 wherein the front panel includes at least three sleeves, one for receiving an input portion of a plug, one for receiving an output portion of a plug, and one for receiving a monitor plug.

6. The assembly according to claim 5 further comprising at least two jack frames, each frame including a switch support member on which at least one switch assembly is mounted.

7. A jack panel module comprising:
    a holder; and
    at least two jack assemblies mounted within the holder, each assembly comprising a front panel including a single column of at least two sleeves for receiving plugs therein, one for receiving an input plug and one for receiving an output plug, the sleeves being positioned in the panel so that the input sleeve and output sleeve in one assembly are each staggered with respect to an input sleeve and output sleeve of an adjacent assembly.

8. The module according to claim 7 wherein each panel includes portions which are thinner than portions including the sleeves, the thinner portions of one assembly being adjacent to the portions of an adjacent assembly including the sleeves.

9. The module according to claim 7 wherein each front panel includes at least three sleeves, one for receiving an input plug, one for receiving an output plug, and one for receiving a monitor plug.

10. The module according to claim 7 wherein each assembly includes a plurality of terminal pins at a rear portion of the assembly, and the holder includes an array of holes through which the terminal pins are inserted.

* * * * *